Oct. 27, 1964     E. HARVEY     3,154,125
PORTFOLIO
Filed April 12, 1962     2 Sheets-Sheet 1
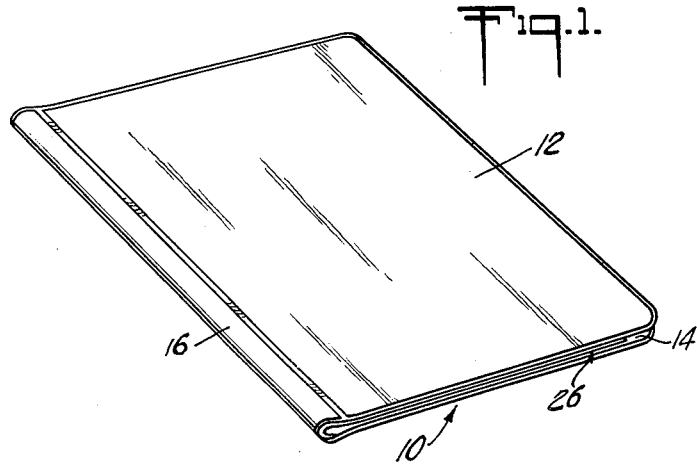
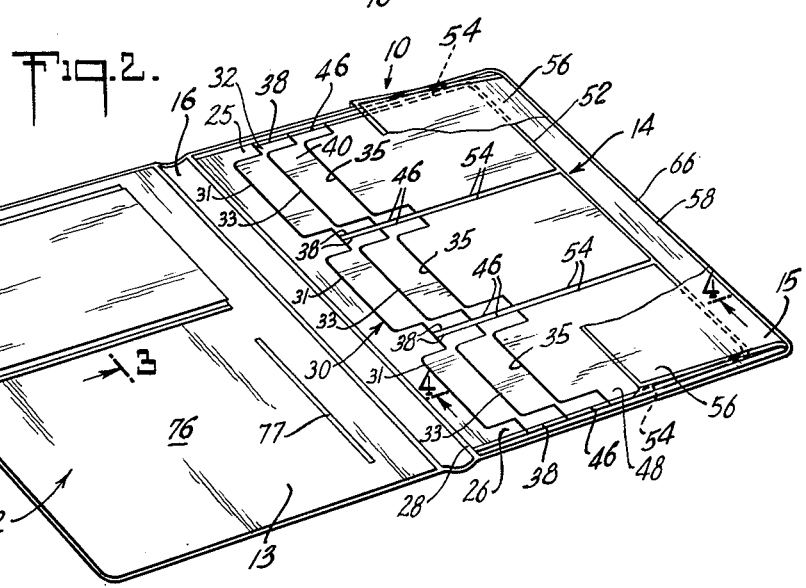
INVENTOR
EVELYN HARVEY
BY
Morgan Finnegan Durham & Pine
ATTORNEYS

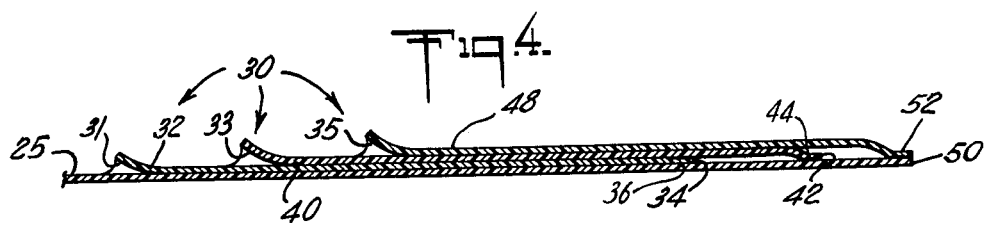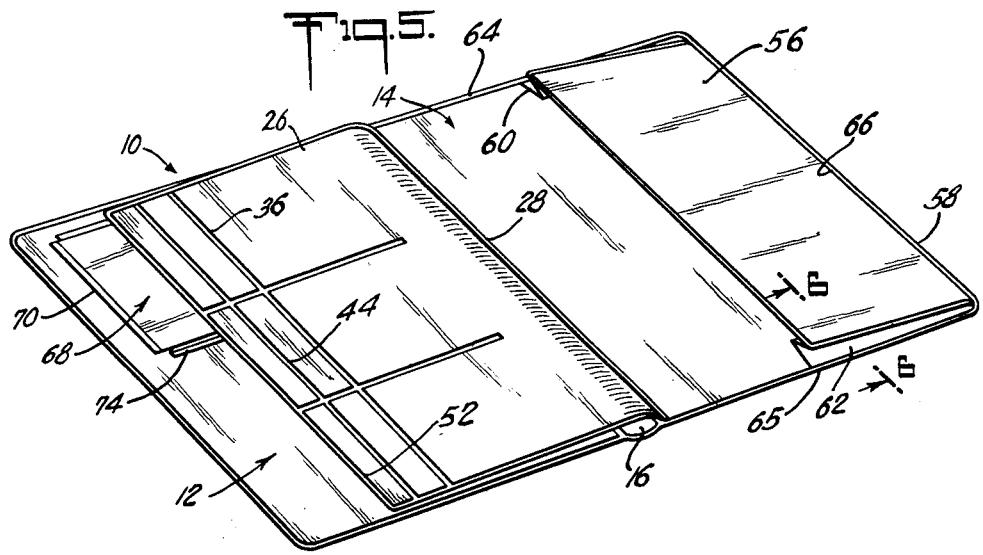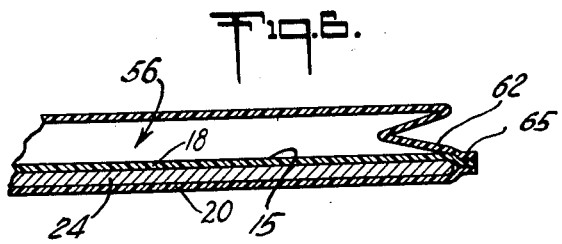

United States Patent Office 3,154,125
Patented Oct. 27, 1964

3,154,125
PORTFOLIO
Evelyn Harvey, New York, N.Y., assignor to Kenn-Harvey Associates, New York, N.Y., a partnership
Filed Apr. 12, 1962, Ser. No. 186,990
1 Claim. (Cl. 150—52)

The present invention relates to portfolios and more particularly to a device for retaining and storing elongated receipts such as bank checks.

The use of checking accounts has increased widely in recent years. However, each month presents the user with the problem of properly preserving his cancelled checks as receipts for payment. In addition, the cancelled checks provide a quick and easy method of keeping track of expenditures for any particular item, such as rent or food. However, heretofore, there has been no facile way of both preserving the cancelled checks and simultaneously maintaining a check on expenditures.

The present invention is characterized in that it includes a portfolio having a pair of covers hingedly interconnected and provided with a plurality of rows of elongated pockets with a number of pockets preferably arranged in overlying relationship. The pockets correspond to particular items, such as food, auto, rent, entertainment, clothing, taxes, etc. The pockets are of such a length and width as to comfortably accommodate the conventional bank check. The portfolio is preferably of plastic with stiffened covers. There is also provided a lower gusseted pocket extending across the entire width of the cover for larger items, such as bank statements. An additional pocket to hold unpaid bills, and an area approximately ½ the width of the face of the cover, with a slit for inserting a separate budget or note pad, are provided on the inside face of one of the covers.

It is another object of the invention to provide a portfolio for the ready retention and systematic storing of elongated receipts.

A further object of this invention is to provide a portfolio for the retention and systematic storing of bank checks in pre-determined arrangement corresponding to the particular type of expenditure.

It is therefore the object of this invention to provide a portfolio for storing bank checks having a plurality of rows of interior pockets, the pockets in the rows being arranged in overlying relationship.

Another object of the invention includes providing a portfolio having a pair of opposed, hingedly interconnected covers and interior leaf attached to the covers and having a number of rows of superposed pockets for storing bank checks in pre-determined order.

Objects and advantages of the invention will be obvious herefrom, or may be learned by practice with the invention, the same being realized and attained by means of the instrumentalities and combinations pointed out in the appended claims.

The foregoing general description and the following detailed description are exemplary and explanatory but are not restrictive of the invention.

Of the drawings illustrating, by way of example, a preferred embodiment of the invention:

FIG. 1 is a perspective view of a portfolio embodying the subject invention with the covers in closed position.

FIG. 2 is a perspective view of the portfolio of FIG. 1 with the covers in open position and showing the pocket leaf in operative disposition.

FIG. 3 is a sectional view taken along line 3—3, FIG. 2.

FIG. 4 is a sectional view taken along line 4—4, FIG. 2, showing the interior leaf and arrangement of tiers of pockets.

FIG. 5 is a perspective view of the open portfolio of FIG. 2 with the pocket leaf in non-operative position.

FIG. 6 is a sectional view taken along line 6—6, FIG. 5.

Referring to the drawings, and specifically FIGS. 1 and 2, there is disclosed a portfolio, designated generally 10, embodying the present invention. Portfolio 10 includes a pair of cover members 12 and 14 hingedly interconnected as at longitudinal seam 16. Preferably, covers 12 and 14 are formed of sheets 18 and 20 of thermoplastic material heat-sealed as along edge 22. To provide stiffeners for covers 12 and 14, a stiffening material such as a cardboard sheet 24 is sealed between sheets 18 and 20.

Between the inner faces 13 and 15 of covers 12 and 14, there is provided an interior leaf 26. Leaf 26 is of thermoplastic material similar to covers 12 and 14, and is preferably hingedly attached as by heat-sealing 28 to the inner face 15 of cover 14 adjacent seam 16 as shown best in FIGS. 2 and 5.

To provide check storing space for the various categories, leaf 26 is provided with a plurality of rows of superposed pockets 30. In the preferred embodiment, leaf 26 has three rows of three pockets each for a total of nine pockets corresponding to nine different categories of expenditures. It will be understood that the size of the covers 12 and 14 and leaf 26 can be readily altered to provide more or less pockets as desired.

Turning to FIG. 4, the innermost tier 31 of pockets 30 of each row are formed by attaching, as by heat-sealing, a sheet 32 preferably of thermoplastic material to upper face 25 of leaf 26 as viewed in FIG. 2. Sheet 32 is attached along its lower edge 34 to face 25 of leaf 26 at 36. The inner tier 31 of pockets 30 are completed by heat-sealing their side edges 38 to leaf 26.

The middle tier 33 of pockets 30 are formed by attaching, as by heat-sealing, a sheet 40 preferably of thermoplastic material to upper face 25 of leaf 26. Sheet 40 is attached along its lower edge 42 to face 25 at 44. The middle tier 33 of pockets 30 is completed by heat-sealing its side edges 46 to leaf 26.

The outermost tier 35 of pockets 30 is formed by attaching, as by heat-sealing, a sheet 48 preferably of thermoplastic material to upper face 25 of leaf 26. Sheet 48 is attached along its lower edge 52 to the free end 50 of leaf 26. The outer tier 35 of pockets 30 is completed by heat-sealing its edges 54 to leaf 26.

It will be understood that if desired adjacent side edges 38 in tier 31 may be heat-sealed simultaneously in a single operation. This applies to adjacent side edges 46 and 54 as well. Further, overlying side edges 38, 46 and 54 of each tier may, if desired, also be simultaneously heat-sealed in a single operation whereby the pockets 30 of each tier are completed together.

To provide a place for storing documents such as bank statements which are larger than the conventional bank check, there is provided a gusseted pocket 56 adjacent the free edge 58 of cover 14. Pocket 56 is preferably of thermoplastic material and formed with gusseted sides 60 and 62. Sides 60 and 62 are attached as by heat-sealing to the top and bottom edges 64 and 65 respectively of cover 14 along the inner face 15 thereof as shown in FIG. 6. The completed pocket 56 is formed by attaching as by heat-sealing its bottom edge 66 to the face 15 adjacent edge 58.

In normal operation, leaf 26 is positioned inside pocket 56 as shown in FIG. 2. This permits access to pocket 56 yet maintains leaf 26 in operative position.

Portfolio 10 is also provided with an auxiliary gusseted pocket 68 secured to the inner face 13 of cover 12. Pocket 68 is available for storing unpaid bills. Pocket 68 is preferably of thermoplastic material and formed by attaching as by heat-sealing, bottom 70 and sides 72 and 74 thereof to face 15.

In the preferred embodiment, pocket 68 is so dimensioned as to occupy no more than one half the area of face 13 as shown in FIG. 2. This provides a free area 76 which includes a slit 77 in the inner face 13 of cover 12. Slit 77 adapts area 76 to receive a separate budget or note pad.

In use, the portfolio serves as a ready storage and systematic filing device for checks. Each cancelled check is placed in its appropriate pocket 30 in accordance with the particular expenditure represented thereby. If desired, the pockets 30 can be provided with windows and removable tabs so that the user can arrange his own expenditure categories.

The bank statements received with the checks are inserted into pocket 56 where they are available for ready reference. Pocket 68 provides storage for unpaid bills, while space 76 furnishes a free area with a slit for inserting separate budget or note pad.

Thus, the subject invention provides a compact portfolio for the ready and facile retention and systematic storing of bank checks and related documents.

What I claim is:

A portfolio for storing bank checks and the like comprising a pair of opposed, stiffened covers, means hingedly interconnecting said covers for movement into and out of overlying closed relationship, an interior leaf, means hingedly interconecting said leaf to the inner face of one of said covers adjacent the interconnection of said covers, a plurality of rows of superposed, staggered pockets formed on said leaf, each pocket corresponding to a particular expenditure, and said pockets adapted to retain checks therein in pre-determined arrangement, means forming an enlarged pocket across the face of said one cover and secured adjacent the edge of said one cover remote from said hinged connection thereto, gusset pleats formed in each side of said enlarged pocket, said interior leaf adapted to overlie said gusseted pocket, and means forming an auxiliary pocket on the inner face of the other of said covers, said auxiliary pocket being restricted to a portion of the associated cover face to provide a free area on the remainder of said cover, and a slit formed in the inner face of said auxiliary pocket bearing cover.

References Cited in the file of this patent
UNITED STATES PATENTS

| | | |
|---|---|---|
| 1,417,854 | Newton | May 30, 1922 |
| 1,859,631 | Osborn | May 24, 1932 |
| 2,452,096 | Bertalotto | Oct. 26, 1948 |
| 2,647,071 | Schade | July 28, 1953 |
| 2,732,875 | Martin | Jan. 31, 1956 |
| 2,815,126 | Deckers | Dec. 3, 1957 |

FOREIGN PATENTS

| | | |
|---|---|---|
| 478,848 | Italy | Mar. 5, 1953 |